United States Patent
Wolpert et al.

(10) Patent No.: US 9,470,322 B2
(45) Date of Patent: Oct. 18, 2016

(54) DIAPHRAGM VALVE

(75) Inventors: Kai-Uwe Wolpert, Krautheim (DE);
Jürgen Mayer, Schwäbisch Hall (DE)

(73) Assignee: GEMÜ GEBR. MÜLLER APPARATEBAU GMBH & CO. KOMMANDITGESESELLSCHAFT, Ingelfingen (DE)

( * ) Notice: Subject to any disclaimer, the term of this patent is extended or adjusted under 35 U.S.C. 154(b) by 86 days.

(21) Appl. No.: 14/232,079

(22) PCT Filed: Jul. 2, 2012

(86) PCT No.: PCT/EP2012/062844
§ 371 (c)(1),
(2), (4) Date: Jan. 10, 2014

(87) PCT Pub. No.: WO2013/017355
PCT Pub. Date: Feb. 7, 2013

(65) Prior Publication Data
US 2014/0158923 A1 Jun. 12, 2014

(30) Foreign Application Priority Data

Jul. 29, 2011 (DE) .................. 10 2011 080 139
Oct. 6, 2011 (DE) .................. 10 2011 084 075

(51) Int. Cl.
*F16K 7/12* (2006.01)
*F16K 27/02* (2006.01)

(52) U.S. Cl.
CPC .............. *F16K 7/12* (2013.01); *F16K 7/126* (2013.01); *F16K 27/0236* (2013.01)

(58) Field of Classification Search
CPC ...... F16K 7/12; F16K 7/126; F16K 27/0236; F16K 7/16; F16K 41/12; F16J 3/02
USPC .................. 251/331, 335.2, 61–65
See application file for complete search history.

(56) References Cited

U.S. PATENT DOCUMENTS

| | | | |
|---|---|---|---|
| 3,955,794 A * | 5/1976 | Hankosky | 251/123 |
| 4,537,387 A * | 8/1985 | Danby et al. | 251/331 |
| 4,671,490 A | 6/1987 | Kolenc et al. | |
| 4,936,542 A | 6/1990 | Beard | |

(Continued)

FOREIGN PATENT DOCUMENTS

| CN | 87 1 03612 | 11/1987 |
|---|---|---|
| DE | 38 13 925 | 11/1988 |

(Continued)

OTHER PUBLICATIONS

International Search Report issued by the European Patent Office in International Application PCT/EP2012/062844 on Aug. 9, 2012.

*Primary Examiner* — Michael R Reid
(74) *Attorney, Agent, or Firm* — Henry M. Feiereisen LLC

(57) ABSTRACT

A diaphragm valve, in particular for fluid media, includes a valve body, a diaphragm, and a connecting piece which can be actuated by a drive unit to act on the diaphragm, wherein the valve body and the diaphragm are made of plastic. Two mutually independent seals are provided for sealing the fluid medium with respect to the outside, wherein the valve body and the diaphragm are welded to each other, and the diaphragm is mechanically sealed between the drive unit, or an intermediate piece, and the valve body.

5 Claims, 4 Drawing Sheets

(56) References Cited

U.S. PATENT DOCUMENTS

| | | |
|---|---|---|
| 6,116,281 A | 9/2000 | Mastromatteo |
| 2002/0158222 A1 | 10/2002 | Johnson et al. |
| 2003/0042459 A1* | 3/2003 | Gregoire ............ F16K 7/14 251/331 |
| 2006/0174949 A1 | 8/2006 | Muller |
| 2006/0255306 A1 | 11/2006 | Scheibe |
| 2007/0120086 A1 | 5/2007 | Yoshino et al. |
| 2011/0308655 A1* | 12/2011 | Keeper ............ F16K 7/16 138/89 |
| 2012/0097880 A1 | 4/2012 | Boettcher et al. |

FOREIGN PATENT DOCUMENTS

| | | |
|---|---|---|
| DE | 100 62 790 | 7/2002 |
| DE | 202005002152 | 7/2006 |
| DE | 102005021583 | 11/2006 |
| EP | 0 105 738 | 4/1984 |
| JP | 61-160666 | 7/1986 |
| JP | 07-055028 | 3/1995 |
| JP | 2005-163877 | 6/2005 |
| KR | 10-1993-0000867 | 1/1993 |
| KR | 10-2005-0032935 | 4/2005 |
| WO | WO 2010/025905 | 3/2010 |

* cited by examiner

DIAPHRAGM VALVE

CROSS-REFERENCES TO RELATED APPLICATIONS

This application is the U.S. National Stage of International Application No. PCT/EP2012/062844, filed Jul. 2, 2012, which designated the United States and has been published as International Publication No. WO 2013/017355 and which claims the priority of German Patent Applications, Serial No. 10 2011 080 139.1, filed Jul. 29, 2011, and Serial No. 10 2011 084 075.3, filed Oct. 6, 2011, pursuant to 35 U.S.C. 119(a)-(d).

BACKGROUND OF THE INVENTION

The invention relates to a diaphragm valve, in particular for fluid media, having a valve body, a diaphragm and a connecting piece actuatable by a drive unit for operating the diaphragm, wherein the valve body and the diaphragm are made of plastic.

Diaphragm valves having a valve body with an inflow and an outflow (DE 20 2005 002 152 U1) are known in the art. Furthermore, the valve bodies have a valve seat that can be sealed by a diaphragm, wherein the diaphragm is connected via a connecting piece with a pressure piece of a drive unit.

In a conventional diaphragm valve, the diaphragm is clamped during assembly between the drive unit or an intermediate piece, on the one hand, and the valve body, on the other hand. In this case, both the drive unit or the intermediate piece and the valve body may have a so-called QHD sealing contour.

WO 2010/025 905 A1 describes a single-layer diaphragm, which can also be integrally formed with the connecting piece or which can be formed on the connecting piece. The diaphragm is made of the same plastic material as the valve body, for example of polyethylene (PE) or polypropylene (PP). In addition, the valve body and the diaphragm are fixedly connected to each other by ultrasonic welding to form a fluid-tight valve body unit which can be coupled with the drive unit.

The fixed connection between the valve body and the diaphragm to form a sealed valve body unit allows to form the valve body unit as a disposable unit, and to integrate the diaphragm valve into a disposable tube system or a pre-sterilizable pharmaceutical facility. The valve body unit can therefore be formed inexpensively as a disposable or single-use valve body unit and coupled or connected to a reusable drive unit. The valve body unit is sealed during the transport phase by the fixed connection of the diaphragm and the valve body. Contamination of the valve chamber and the environment is thus avoided. However, it has been observed that the welding of the diaphragm and the valve body, particularly when using ultrasound, generates abraded particles intrinsic to the process. These abraded particles can no longer be flushed out of the valve after the welding. However, the abraded particles could be detected as a residue in the liquid and/or gas stream flowing through the valve even when the valve is used as intended.

SUMMARY OF THE INVENTION

It is therefore the object of the invention to provide a diaphragm valve which meets the highest standards for sealing as well as for the sterile treatment of the media to be carried.

This object is attained with the invention in that two independent seals are provided for the fluid medium to the outside, wherein the valve body and the diaphragm are welded to each other and the diaphragm is mechanically sealed between the drive unit or an intermediate piece, on the one hand, and the valve body, on the other hand.

Thus, the connection of the invention has two seals that are independent of each other. The first mechanical seal provides the leak-tightness of the valve towards the outside due to the pressure exerted on the diaphragm by way of the components equipped with this contour (valve body and drive unit or intermediate piece).

The second seal is attained by welding the diaphragm and the valve body together. Thus, the diaphragm valve according to the invention has two independent seals towards the outside, and is ideally suited for use as a single-use valve.

The welded seal ensures the leak-tightness of the valve body assembly towards the outside during the transport. Moreover, the other seal acts in addition as soon as the valve body unit is coupled to the intermediate piece arranged on the drive unit.

In a preferred embodiment of the invention, the mechanical seal is constructed as a clamping or squeezing. Such seals are known and have been proven effective for decades. They are easy to manufacture and reliable.

In an advantageous embodiment of the diaphragm valve according to the invention, the two seals are arranged in a circle. Grooves and/or projections in the shape of a circular arc can be easily produced. In addition, the shape of a circular arc provides a much better seal than other shapes.

Preferably, the two seals are formed as concentric circles. The symmetry also allows improved sealing compared to other sealing arrangements.

According to the invention, the mechanical seal is located radially inwardly, whereas the welded seal is located radially outwardly. When the diaphragm valve is mounted on the intermediate piece prior to being exposed to the process fluid and/or gas, the inward mechanical seal seals the valve seat exposed to the flow against the further outward welded seal or against the particles generated during welding. This double seal guarantees that the valve body unit is free of particles. The additional mechanical seal is now located between the welded sealing edge and the actual valve seat, across which the fluid flows. This seal traps all particles generated during the ultrasonic welding between the mechanical and the welded seal.

In a preferred embodiment of the invention, the mechanical seal is a (Qualified Hygienic Design) QHD seal. This seal ensures that the diaphragm valve according to the invention can also be used in clean rooms, e.g. in chip manufacturing, in food processing and in the pharmaceutical industry.

Manufacturers of food and pharmaceuticals require that manufacturers of equipment and components for low-germ or sterile applications demonstrate compliance with the basic rules for a hygienic design and easy cleanability. The previously applied methods to verify cleanability are very complex, costly and the results are difficult to interpret. An alternative is the test system Qualified Hygienic Design (QHD) from VDMA.

QHD refers to a system for checking the cleanability of components. The first stage involves the theoretical proof of a hygienic design. Compliance with these standards relevant for the respective component can be documented by a self-certification and by the QHD symbol affixed to the component. The manufacturer declares therein that he adhered to the requirements set forth in the regulations for a hygienic design. The second stage deals with the practical proof of cleanability. The cleanability is checked by using a standard test, which was developed by the Department of Machine and System Science at the Technical University of Munich/Weihenstephan. The ATP method is presently used as the standard test. It has proven effective in various areas of food production and hygiene-related issues. ATP is an energy-storing material which is present in seeds, animal and plant cells. The test is based on a biochemical reaction of the luciferin-luciferase system. The light emitted due to the bioluminescence is measured and its intensity is evaluated. Unit of measurement for the amount of light are Relative Light Units (RLU).

Ease of manufacture and optimal sealing is achieved by constructing the mechanical seal in the form of projections, on one hand, on the valve body and/or, on the other hand, on the drive unit or on the intermediate piece. The diaphragm can be optimally clamped between such projections which are advantageously circumferential. Advantageously, the projections face each other and accommodate the diaphragm between them.

In a preferred embodiment of the invention, the welded seal is formed in a tongue and groove seal. The valve body is hereby provided with a groove, into which a tongue provided in the diaphragm engages. In preferred embodiments, the groove and/or the tongue have a rectangular or frustoconical cross-section.

Additional advantages, features and details of the invention are recited in the dependent claims and disclosed in the following description in which an especially preferred embodiment is described in detail with reference to the drawing. The features illustrated in the drawing and mentioned in the description and/or in the claims may each be essential to the invention either severally or in any combination.

BRIEF DESCRIPTION OF THE DRAWING

The drawings show in.

DETAILED DESCRIPTION OF PREFERRED EMBODIMENTS

Figure 1:
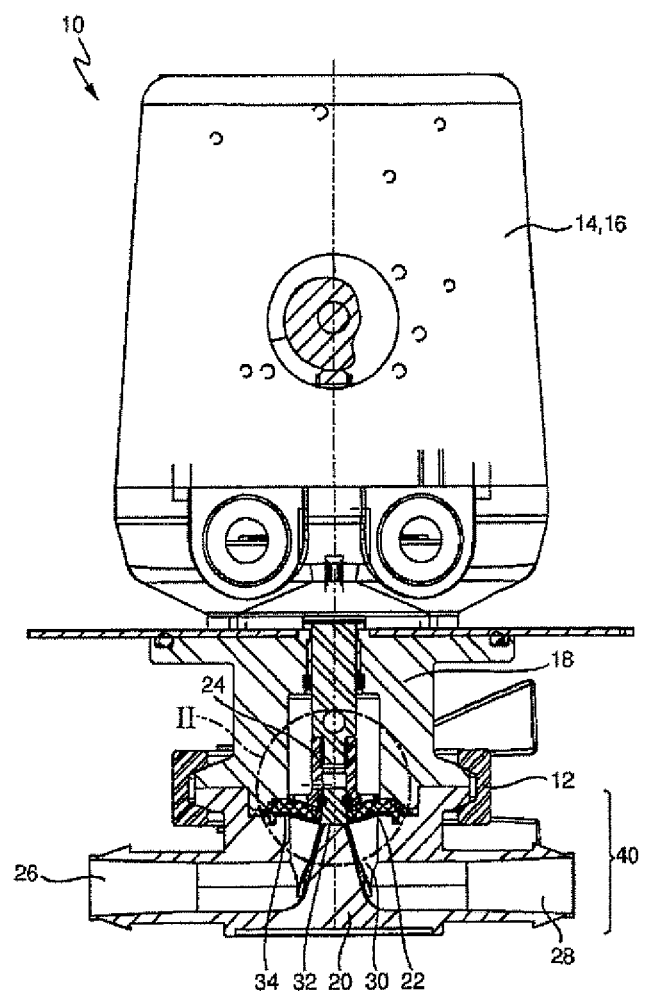
FIG. 1 a longitudinal section through a diaphragm valve with a drive unit.

FIG. 1 shows a diaphragm valve, denoted overall with 10, with a valve body 20 being attached to a drive unit 14 with a clamp 12, wherein the drive unit 14 includes an electrically, hydraulically or pneumatically operated drive unit 16 and an intermediate piece 18. The valve body 20 is equipped with a diaphragm 22 with a connecting piece 24 which is shown in detail in FIG. 2. The valve body 20 has an inlet 26 and an outlet 28, which open into a valve chamber 30 confined between the valve body 20 and the diaphragm 22, wherein the connection between inlet 26 and the outlet 28 is interrupted when the diaphragm 22 is pressed against a valve seat 32.

The diaphragm 22 is supported on a shoulder 34 of the valve body 20 projecting over the valve seat 32 and seals the valve body 20 against the drive unit 14 and the environment. The valve body 20 and the diaphragm 22 in the exemplary embodiment are formed of plastic, especially of polyethylene (PE) or polypropylene (PP) or a thermoplastic elastomer (TPE).

Figure 2:
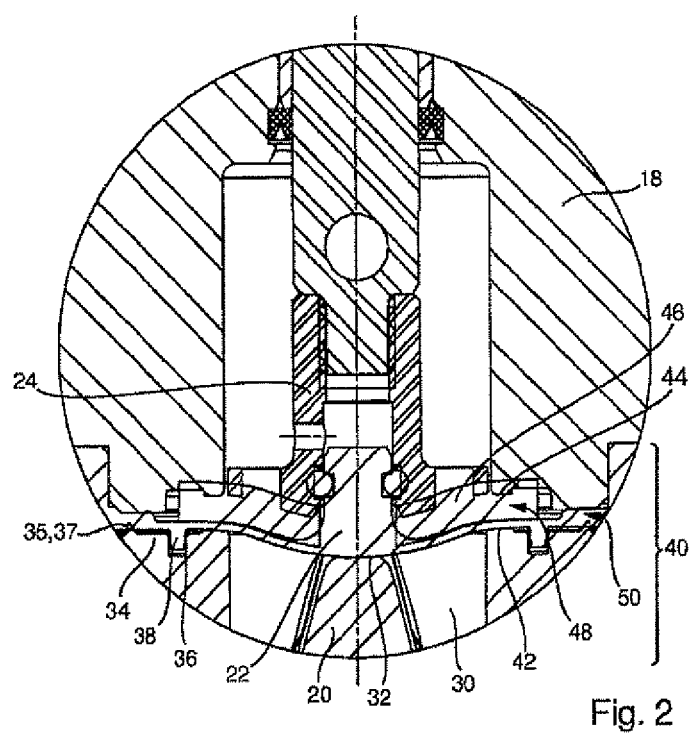
FIG. 2 an enlarged reproduction of the detail II of FIG. 1.
Figure 3:
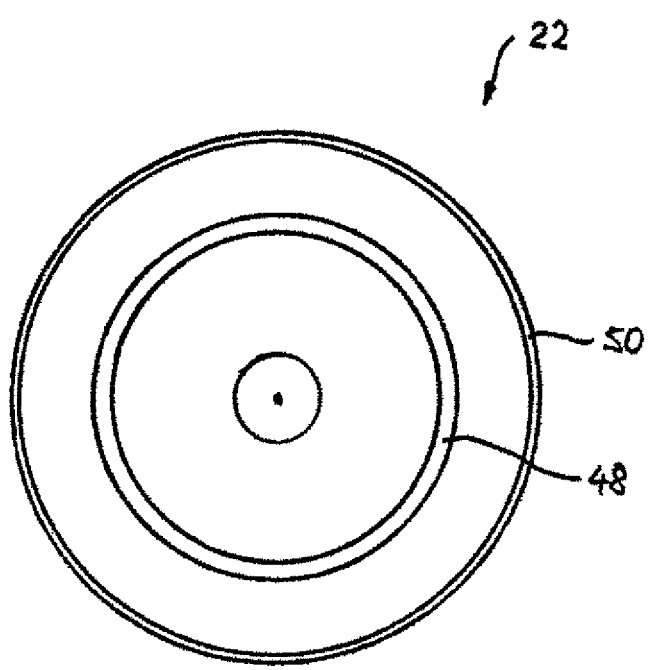
FIG. 3 two seals arranged in a circle.
Figure 4:
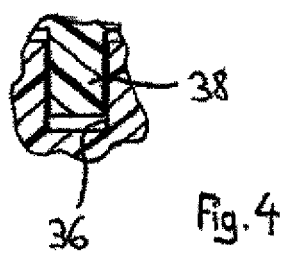
FIGS. 4 to 7 a tongue-and-groove arrangement having various rectangular or frustoconical cross-sections.
Figure 5:
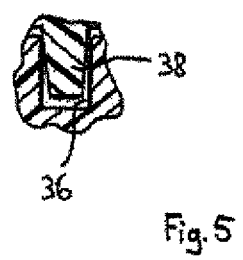
Figure 6:
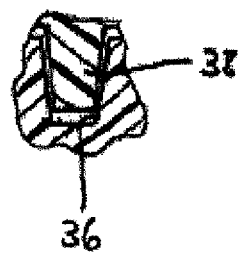
Figure 7:
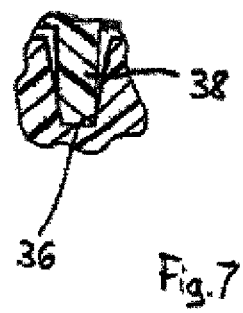

As can be seen from FIG. 2, the diaphragm 22 and the valve body 20 are connected to each other liquid- and gas-tight in the region of the shoulder 34, in particular by ultrasonic welding. For this purpose, the valve body 20 has in the region of its shoulder 34 an energy director 35 in the form of an annular edge 37 extending circumferentially around the valve chamber 30. Radially inward, the diaphragm 22 is provided with a circumferentially extending annular tongue 38 which engages in a groove 36 provided in the shoulder. The groove 36 has a rectangular cross-section, whereas the tongue 38 has a frustoconical cross-section, which facilitates insertion of the tongue 38 into the groove 36. The tongue 38 and the groove 36 prevent welding residue from entering into the valve chamber 30. Welding produces a valve body unit 40 that can be handled independently, and whose valve chamber 30 is sealed by the diaphragm 22 to the outside.

When the valve body unit 40 is attached to the intermediate piece 18, the diaphragm 22 is additionally clamped. For this purpose, the valve body 20 has at its shoulder 34 a circumferential annular projection 42 which is located radially inwardly of the groove 36. A projection 44 is also located on the intermediate part 18 opposite the projection 42, so that the diaphragm 22 is squeezed when the valve body 20 and the intermediate piece 18 are joined. In the exemplary embodiment of FIG. 2, the backside of the diaphragm 22 is covered by a damping disk 46 that prevents the diaphragm 22 from flapping. The projections 42 and 44 in this exemplary embodiment are dimensioned such that not only the diaphragm 22 but also the damping disk 46 is clamped.

Clamping provides a mechanical seal 48 as opposed to welding 50. Moreover, clamping produces a QHD seal. As already mentioned, the groove 36 and the tongue 38 prevent the process-inherent particulate matter abraded during welding 50 of the diaphragm 22 and the valve body 20 that can no longer be flushed out of the valve body unit 40 after welding 50 from entering the liquid- and/or gas-stream flowing through the diaphragm valve 10. The abraded particles remain trapped between the weld 50 and the mechanical seal 48.

The invention claimed is:
1. A diaphragm valve, comprising:
a valve body made of plastic and comprising a valve seat, an inlet and an outlet, with the valve seat, the inlet and the outlet constructed as an unitary body,
a single-layer diaphragm made of plastic, the diaphragm interrupting a connection between the inlet and the outlet when pressed against the valve seat,
a connecting piece actuated by a drive unit for operating on the diaphragm,
an intermediate piece of the drive unit located between a drive assembly and the diaphragm,
a first seal constructed as a welded seal which connects and seals the diaphragm only to the valve body and not to the intermediate piece, between the valve body and the diaphragm to seal a fluid medium to an outside of the valve body, with the diaphragm and the valve body forming a unitary single-use unit,
a second seal constructed as a mechanical seal which additionally seals the diaphragm between the drive unit or the intermediate piece and the valve body, with the mechanical seal being provided by clamping the diaphragm by way of a circumferential annular projection arranged on the valve body or on the intermediate piece, and a third seal formed of a groove and a tongue arranged radially inward of the welded seal and radially outward of the mechanical seal.

2. The diaphragm valve of claim 1, wherein the mechanical seal is constructed as a clamping or squeezing seal.

3. The diaphragm valve of claim 1, wherein the mechanical seal is arranged radially inward and the welded seal is arranged radially outward.

4. The diaphragm valve of claim 1, wherein the groove is arranged in the valve body and the tongue is arranged on the diaphragm, with the tongue engaging in the groove.

5. The diaphragm valve of claim 1, wherein at least one of the groove and the tongue has a rectangular or frusto-conical cross-section.

* * * * *